United States Patent
Isham et al.

(10) Patent No.: US 7,932,704 B1
(45) Date of Patent: Apr. 26, 2011

(54) SYSTEM AND METHOD OF PROVIDING CONTROL PULSES TO CONTROL OPERATION OF A CONVERTER WITH HIGH FREQUENCY REPETITIVE LOAD TRANSIENTS

(75) Inventors: Robert H. Isham, Flemington, NJ (US); Weihong Qiu, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 188 days.

(21) Appl. No.: 12/359,569

(22) Filed: Jan. 26, 2009

Related U.S. Application Data (60) Provisional application No. 61/025,495, filed on Feb. 1, 2008.

(51) Int. Cl.
   G05F 1/10    (2006.01)
   G05F 1/40    (2006.01)
(52) U.S. Cl. ......... 323/241; 323/242; 323/283; 323/285
(58) Field of Classification Search .................. 323/237, 323/240–243, 246, 282–285, 288
   See application file for complete search history.

(56) References Cited

U.S. PATENT DOCUMENTS

| | | | | |
|---|---|---|---|---|
| 7,208,921 | B2 * | 4/2007 | Walters | 323/222 |
| 7,230,406 | B2 * | 6/2007 | Huang et al. | 323/222 |
| 7,294,993 | B2 * | 11/2007 | Clavette et al. | 323/282 |
| 7,453,250 | B2 * | 11/2008 | Qiu et al. | 323/288 |
| 7,652,461 | B2 * | 1/2010 | Tateishi | 323/284 |

* cited by examiner

*Primary Examiner* — Jessica Han
(74) *Attorney, Agent, or Firm* — Gary R. Stanford (57) ABSTRACT

A modulator for providing control pulses on a pulse control signal for controlling operation of a DC-DC converter is disclosed which includes a comparator, pulse control logic, a memory circuit and a switch circuit. The comparator compares a timing waveform with a compensation signal and provides a comparison signal with preliminary pulses. The pulse logic circuit receives the comparison signal and provides normal pulses on a normal pulse signal. The pulse logic circuit selects only those preliminary pulses which are provided during a permissible time window of each period of the periodic timing waveform. The memory circuit provides a pulse indication whenever a normal pulse does not occur on the pulse signal during any switching period. The switch circuit selects between the normal pulse signal and the comparison signal based on the pulse indication for providing the control pulses.

20 Claims, 5 Drawing Sheets

SYSTEM AND METHOD OF PROVIDING CONTROL PULSES TO CONTROL OPERATION OF A CONVERTER WITH HIGH FREQUENCY REPETITIVE LOAD TRANSIENTS

CROSS-REFERENCE TO RELATED APPLICATIONS

This application claims the benefit of U.S. Provisional Application Ser. No. 61/025,495, filed on Feb. 1, 2008 which is herein incorporated by reference in its entirety for all intents and purposes.

BRIEF DESCRIPTION OF THE DRAWINGS

The benefits, features, and advantages of the present invention will become better understood with regard to the following description, and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Two or more channels of pulse width modulated (PWM) DC-DC converters are often combined in one system to handle higher current loads. The several channels are usually driven so that under steady state load their PWM pulses are equally spaced from channel to channel. As known to those skilled in the art, PWM pulses are the pulse control signals used to control the output of DC-DC converters. In addition, some mechanism is provided to balance the currents between the channels.

Figure 1:
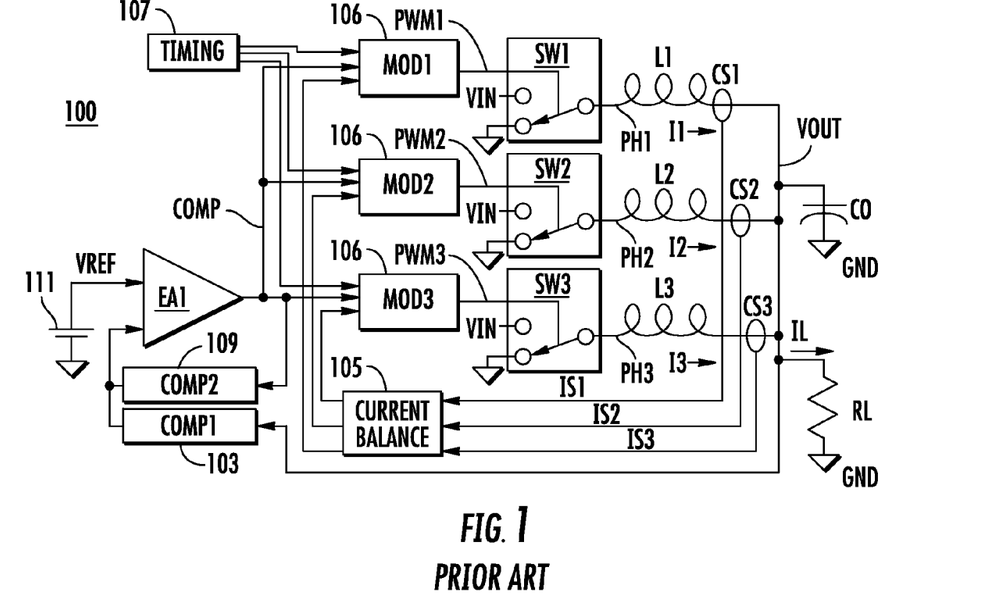
FIG. 1 is a schematic and block diagram of a conventional three channel DC-DC converter which generates PWM phase voltages PH1, PH2, and PH3 (on corresponding phase nodes) and corresponding inductor currents I1, I2, and I3 through corresponding inductors L1, L2 and L3, respectively.

FIG. 1 is a schematic and block diagram of a conventional three channel DC-DC converter 100 which generates PWM phase voltages PH1, PH2, and PH3 (on corresponding phase nodes) and corresponding inductor currents I1, I2, and I3 through corresponding inductors L1, L2 and L3, respectively. PH1 is provided to a first end of L1, PH2 is provided to a first end of L2, and PH3 is applied to a first end of L3, in which the second ends of L1-L3 are coupled together at an output node 101 developing an output voltage VOUT. An output capacitor CO and a load RL are both coupled between output node 101 and ground (GND). GND may otherwise be referred to as a reference voltage level. A load current IL flows into the load RL. VOUT is fed back to one terminal of a first compensation circuit 103, having a second terminal coupled to a first input of an error amplifier EA1. Three current sensors CS1, CS2 and CS3 are coupled to sense I1, I2 and I3, respectively, and to provide respective current sense signals IS1, IS2 and IS3 to respective inputs of a current balance circuit 105. The current balance circuit 105 has three outputs each provided to a respective first input of three modulators 106, individually shown as MOD1, MOD2 and MOD3. A timing circuit 107 has three outputs each provided to a respective second input of the modulators 106. The output of the error amplifier EA1 provides a compensation voltage COMP, which is provided to a third input of each of the modulators 106 and to a first terminal of a second compensation circuit 109. The COMP signal is indicative of relative error of the output voltage. The second compensation circuit 109 has a second terminal coupled to the first input of the error amplifier EA1. A reference voltage source 111 provides a reference voltage VREF to a second input of the error amplifier EA1.

The modulators 106 have outputs PWM1, PWM2 and PWM3, respectively, which are provided to control inputs of three power switching circuits SW1, SW2 and SW3, respectively. The power switching circuits SW1-SW3 are each represented as single-pole, double-throw (SPDT) switches for selecting between an input voltage VIN and GND based on the PWM1-PWM3 signals, respectively. For each power switching circuit SW1-SW3, the selected voltage is provided as a corresponding one of the phase voltages PH1-PH3 provided to the inductors L1-L3.

The error amplifier EA1 with feedback compensation compares the output voltage VOUT with VREF to develop the compensation voltage COMP. COMP is provided to each of the modulators MOD1-MOD3 (106), which develop the PWM1-PWM3 signals to drive the power switching circuits SW1-SW3, respectively. The timing circuit 107 sets the switching period (TSW) and attempts to equally space pulses on the PWM1, PWM2 and PWM3 signals within the switching period TSW. The current balance circuit 105 attempts to equalize the currents I1-I3 between the three channels. Generally, this is done by modifying the width of pulses asserted on the PWM1-PMW3 signals. Although not shown, there may be other inputs such as overcurrent protection or the like. The switch outputs PH1, PH2, and PH3 drive the inductors L1-L3 between VIN and GND based on the state of the power switching circuits SW1-SW3, which are controlled by the PWM1-PWM3 signals, respectively. The inductors L1-L3 and the capacitor CO collectively form an output filter. One or more capacitors complete the output filter, and the resulting output voltage VOUT is fed back through compensation components to EA1.

Figure 2:
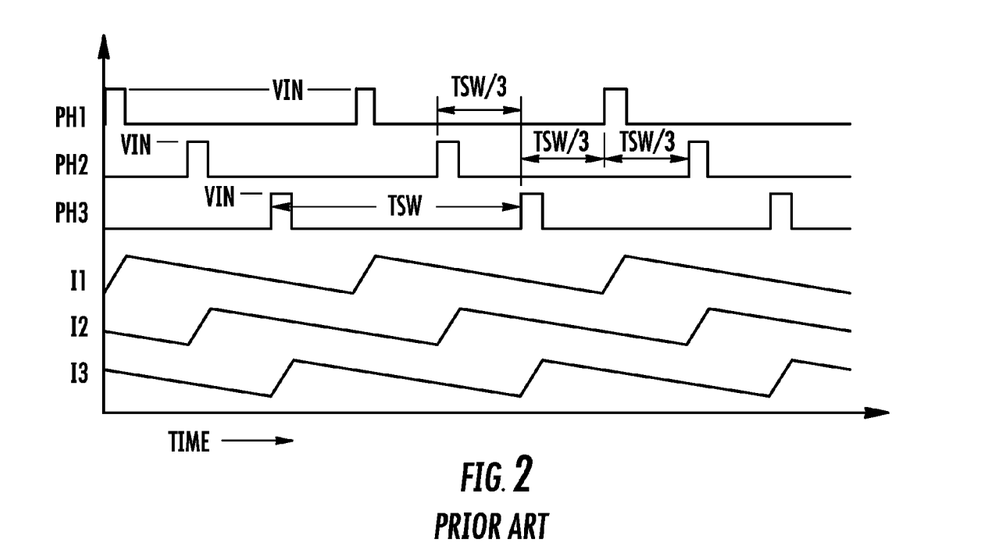
FIG. 2 is a timing diagram plotting the phase voltages PH1-PH3 and the inductor currents I1-I3 versus time for the DC-DC converter of FIG. 1.

FIG. 2 is a timing diagram plotting the phase voltages PH1-PH3 and the inductor currents I1-I3 versus time for the DC-DC converter 100. The phase voltages PH1-PH3 pulse from GND to VIN with a spacing of TSW/3 for this three channel example. When a phase voltage PHi is asserted, the corresponding current Ii increases at a relatively constant rate, and when PHi is de-asserted, the corresponding current Ii increases at a relatively constant rate.

A known problem with the DC-DC converter 100 (and similar systems) occurs when load current transients are applied with a period (TLOAD) near or at the primary switching period, TSW. For example, assume a repetitive load transient is applied so that there is a high load when PH1 is asserted high, but low or no load when either PH2 or PH3 is asserted high. The error amplifier EA1 and the modulators 106 widen the width of PH1 to maintain VOUT at high load. When the load is removed, VOUT generally overshoots and COMP goes low to correct. This might prevent PH2 and/or PH3 from going high, depending on system parameters. The result would be a relatively high I1 current on, and relatively low or even reverse I2 and/or I3 current. The current balance circuit 105 attempts to correct the current unbalance, but for stability reasons is generally limited in its gain and correction range.

Figure 3:
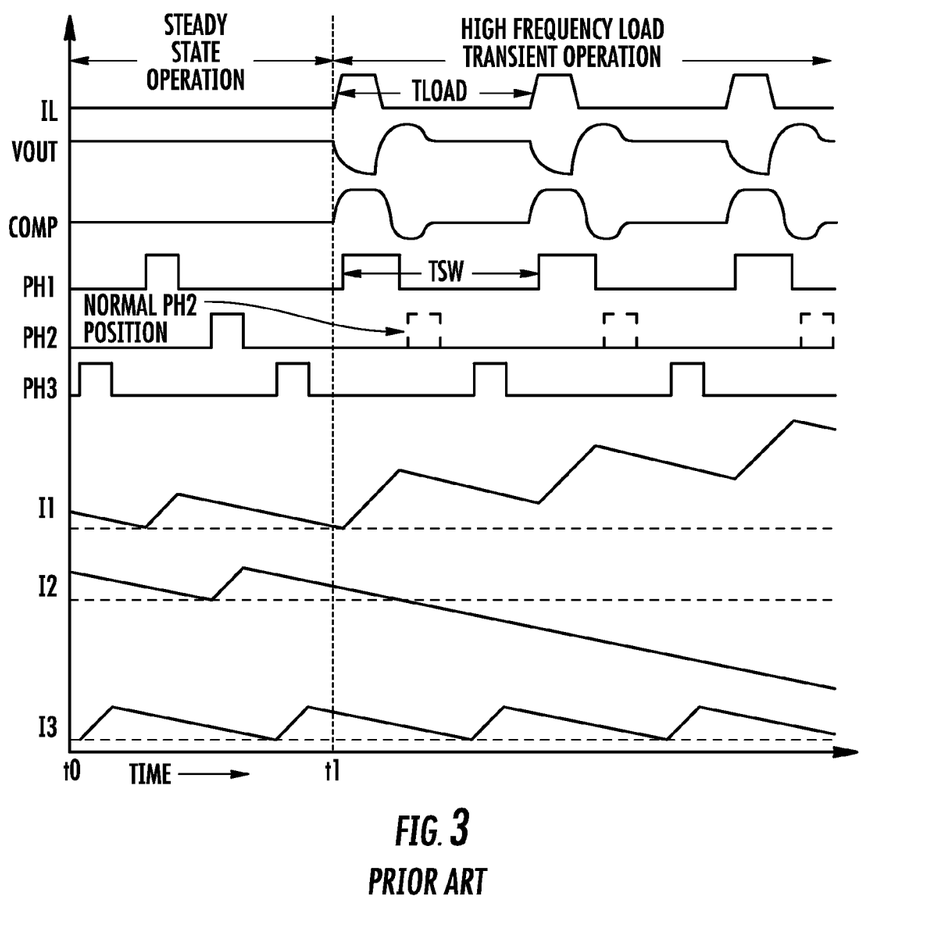
FIG. 3 is a timing diagram illustrating the unbalance condition of the DC-DC converter of FIG. 1 in which the IL, VOUT, COMP, PH1-PH3 and IL1-IL3 signals are plotted versus time.

FIG. 3 is a timing diagram illustrating the unbalance condition of the DC-DC converter 100 in which the IL, VOUT, COMP, PH1-PH3 and IL1-IL3 signals are plotted versus time. Steady state operation occurs during a first time period from time t0 to a time t1 in which the load current IL, the output voltage VOUT and the COMP voltage remain relatively constant. The PH1-PH3 voltages have relatively uniform pulses based on the switching period TSW in which pulses between the phase voltages are spaced TSW/3 as previously described during the steady state operation. After time t1, high frequency load transient operation is initiated in which load current transients are applied with a period TLOAD near or at the primary switching period TSW as shown by regular load pulses occurring on the load current IL. The load current transitions cause similar transitions on VOUT and COMP. During high frequency load transient operation, the unbalance condition is illustrated by PH1 getting wider and I1 increasing, PH2 staying low and I2 decreasing, and PH3 and I3 remaining relatively unchanged. If TLOAD is near but not exactly equal to TSW, then over time different channels line up with the high load condition. Instead of a steady current imbalance between channels, there might appear a beat frequency (not shown). That is, each channel takes turns carrying more than its share of current or carrying reverse current at a frequency about equal to the difference between TSW and TLOAD.

Many modulator schemes only produce a PWM pulse if the error amplifier input and COMP are within some voltage range, and in that range within some specific portion of TSW. The missing PH2 pulses in FIG. 3 (shown with dashed lines) are a result of COMP being below the voltage window during the permissible time window.

Figure 4A:
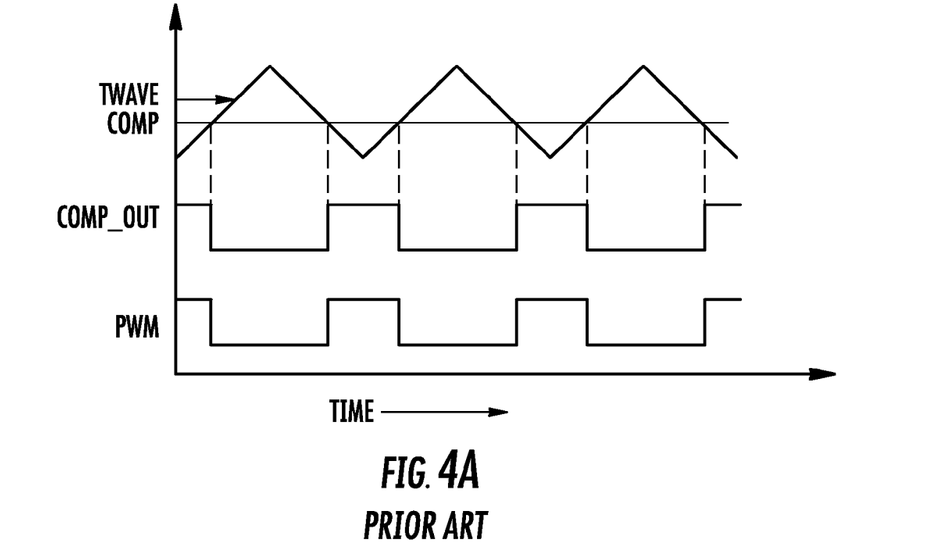
FIGS. 4A and 4B are timing diagrams plotting signals of a common dual slope modulator, such as the DC-DC converter of FIG. 1, during steady state operation and transient load operation, respectively, illustrating missing PWM pulses during the transient load mode of operations.
Figure 4B:
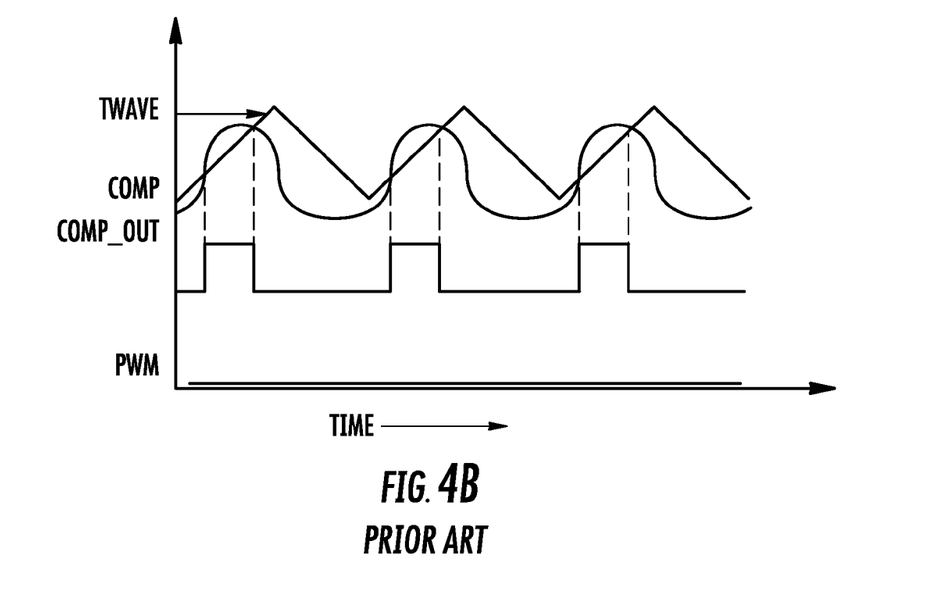

FIGS. 4A and 4B are timing diagrams plotting signals of a common dual slope modulator, such as the DC-DC converter 100, during steady state operation and transient load operation, respectively, illustrating missing PWM pulses during the transient load mode of operation. It is noted that although a dual-slope modulator is used to illustrate the problem of missing PWM pulses, the problem exists with many other types of modulators. As shown in FIG. 4A, in the dual slope modulator a triangle wave signal TWAVE is generated and compared to the COMP signal, such as using a comparator or the like, and the comparison result is used to generate PWM pulses per phase. Although a triangular waveform is illustrated for a dual slope modulator, it is appreciated that different types of periodic timing waveforms, such as sawtooth waveforms, square waves, sinusoidal waveforms, etc., may be used for different types of modulators as understood by those skilled in the art. A steady value of COMP, and that is within the peak to peak voltage of TWAVE, is compared to TWAVE as illustrated by a comparison signal COMP_OUT. COMP_OUT goes high whenever COMP is greater than TWAVE, but is otherwise low. For example, the comparator output goes high during the triangle wave down slope, so is allowed to set the PWM pulse high, and the comparator output goes low during the triangle wave up-slope, so is allowed to terminate the PWM pulse. Logic (not shown) does not permit PWM pulses to be initiated during the up-slope nor terminated during the down slope. This prevents noise on COMP from causing multiple PWM pulses in one TSW period.

As shown in FIG. 4B, COMP has a waveform with a period at or near the switching period of TWAVE, and COMP only crosses above the triangle wave TWAVE during the up-slope. Since in this case the logic does not permit PWM pulses to be initiated during the up-slope nor terminated during the down slope, no PWM pulse is initiated.

A system and method as described herein improves current balance between channels when TLOAD is close to TSW by restoring the missing PWM pulses. In one embodiment, this is accomplished by latching at the end of each TSW period the information of whether a PWM pulse did or did not occur, and if the PWM pulse did not occur, start the PWM pulse by some trigger mechanism other than the one that did not start the pulse. This may still result in a missing PWM pulse if COMP is too low, for instance, but pulses are inserted when COMP is within the normal trigger range but at the wrong time according to existing conventional logic.

Figure 5:
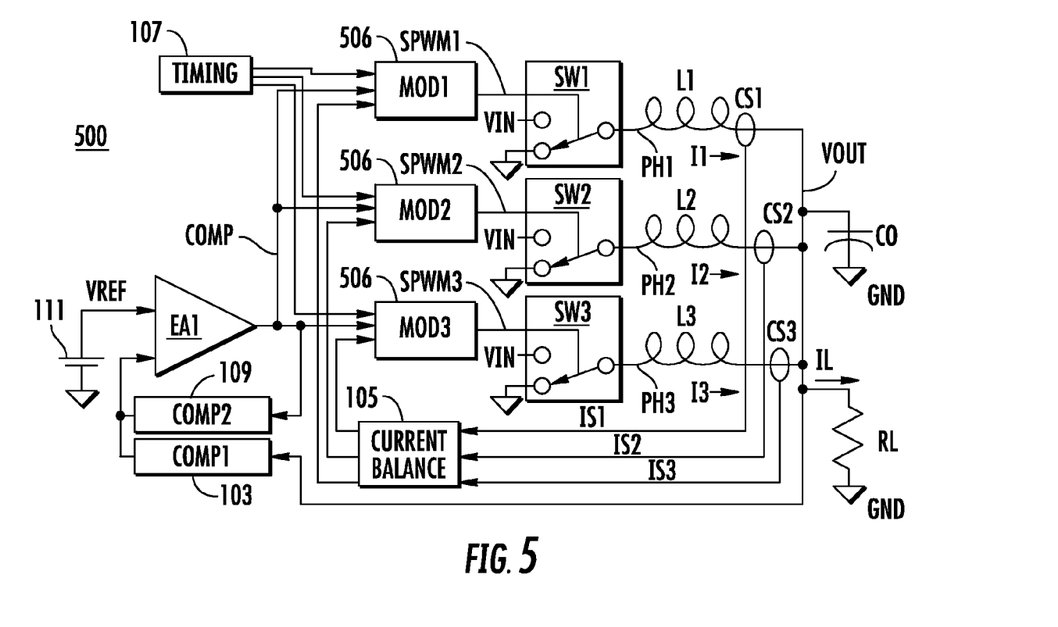
FIG. 5 is a schematic and block diagram of a three channel DC-DC converter including modulators implemented according to one embodiment.

FIG. 5 is a schematic and block diagram of a three channel DC-DC converter 500 including modulators 506 implemented according to one embodiment. The DC-DC converter 500 is similar to the DC-DC converter 100 in which similar components assume identical reference numbers. The modulators 106 of the DC-DC converter 100 are replaced by the modulators 506 in the DC-DC converter 500. The modulators 506 operate in a similar manner as the modulators 106, yet the modulators 506 add alternative or supplemental PWM pulses during high frequency load transient operation as further described herein. As shown, the modulators 506, individually shown as MOD1, MOD2 and MOD3, provide supplemental pulse control or PWM signals SPWM1, SPWM2 and SPWM3, respectively, rather than the PMW1-PWM3 signals.

Figure 6:
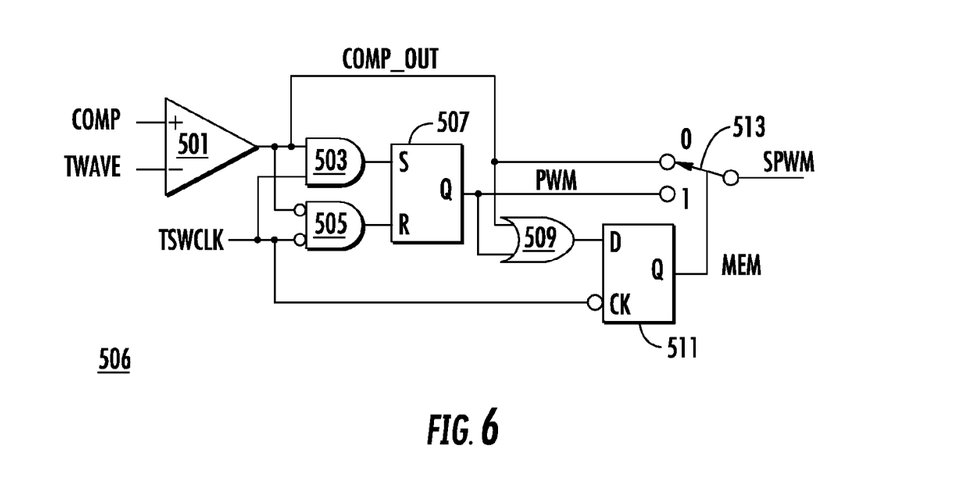
FIG. 6 is a schematic diagram of a portion of each of the modulators of FIG. 5 implemented according to one embodiment.

FIG. 6 is a schematic diagram of a portion of each of the modulators 506 implemented according to one embodiment. Circuit details and coupling of the timing circuit 107 (which sets the switching period and attempting to equally space PWM pulses) and the current balance circuit 105 (which attempts to equalize the currents between the three channels) are not shown. Furthermore, other circuitry generally understood by those of ordinary skill in the art is not shown, such as, for example, a pulse logic circuitry that prevents many PWM pulses in each TSW period when an "anti-double-pulse" circuit, described further below, is disabled.

The COMP and TWAVE signals are provided to the non-inverting (+) and the inverting (−) inputs, respectively, of a comparator 501. The output of the comparator 501 provides a comparison signal COMP_OUT, which is provided to one input each of a two-input AND gate 503, a two-inverting input AND gate 505, and a two-input OR gate 509. The COMP_OUT signal is also provided to a first switched terminal (logic "0") of a SPDT switch 513. A clock signal TSWCLK is provided to the other inputs of the AND gates 503 and 505 and to an inverting clock input (CK, with input inverting bubble) of a D-type flip-flop (DFF) 511. The outputs of AND gates 503 and 505 are provided to the set (S) and reset (R) inputs, respectively, of a set-reset flip-flop (SRFF) 507. The Q output of the SRFF 507 develops the "normal" PWM signal, which is provided to the second switched terminal (logic "1") of the switch 513 and to the other input of the OR gate 509. The output of the OR gate is provided to the data (D) input of the DFF 511, which has its Q output providing a memory signal MEM to a control input of the switch 513. The common terminal of the switch 513 provides a corresponding supplemental PWM signal SPWM. The switch 513 selects PWM as the SPWM signal when MEM is high (or logic "1"), and selects COMP_OUT as the SPWM signal when MEM is low (or logic "0"). The SPWM signal is provided as the pulse control signal output of the modulator 506 rather than the PWM signal.

The COMP_OUT signal is a comparison signal with "preliminary" or potential PWM pulses based on the comparison of the error signal COMP and the periodic timing waveform TWAVE. The AND gates 503 and 505 and the SRFF 507 collectively represent a pulse logic circuit that only allows "normal" ones of the preliminary PWM pulses to occur on the PWM signal under certain conditions. In one embodiment, for example, the pulse logic circuit selects only the preliminary PWM pulses which are provided during a permissible time window of each period of TWAVE. In the illustrated embodiment, the pulse logic circuit selects only those pulses which are initiated during a first portion of each TWAVE period (e.g., while TWAVE is decreasing) and terminated during a second portion of each TWAVE period (e.g., while TWAVE is increasing) according to one dual ramp method. The pulse logic circuit works fine during the steady state operation, but tends to prevent PWM pulses during the high frequency load transient operation as further described herein. The OR gate 509 and the DFF 511 collectively form a "memory" or pulse detect circuit which detects and stores the absence of a normal pulse in any given period or cycle of TWAVE. The switch 513 selects between COMP_OUT and PWM to provide the control pulses on SPWM based on the MEM signal. The SRFF 507 and DFF 511 are latch type devices used for detecting control pulse conditions as described herein.

Figure 7:
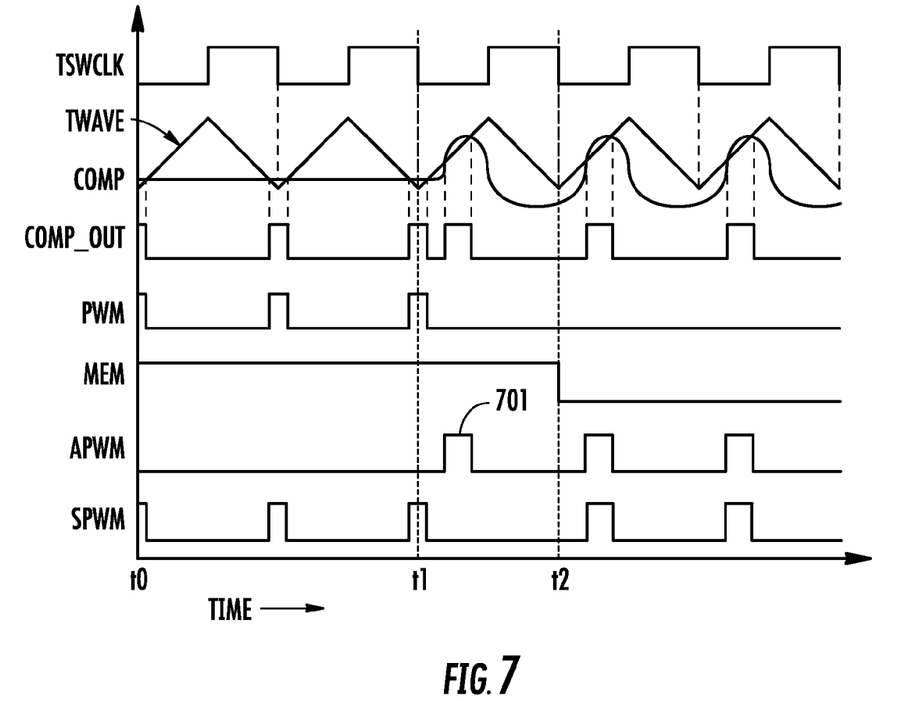
FIG. 7 is a timing diagram plotting signals TSWCLK, TWAVE, COMP, COMP_OUT, PWM, MEM, APWM and SPWM versus time illustrating operation of the modulator of FIG. 5.

FIG. 7 is a timing diagram plotting signals TSWCLK, TWAVE, COMP, COMP_OUT, PWM, MEM, APWM and SPWM versus time illustrating operation of the modulator 506. Steady state operation occurs from time t0 to a time t1 in which COMP remains relatively steady, and high frequency load transient operation is initiated after time t1 in which load current transients are applied with a period TLOAD near or at the primary switching period TSW as shown by regular load pulses occurring on COMP. The TSWCLK signal is synchronous with TWAVE in which TWAVE increases at a constant rate when TSWCLK is low and in which TWAVE decreases at a constant rate when TSWCLK is high. The COMP_OUT signal is high whenever COMP is greater than TWAVE and is otherwise low. Thus, the COMP_OUT signal develops the potential or preliminary control pulses. It is appreciated that an inverse configuration is possible in which COMP_OUT is high whenever COMP is less than TWAVE. The PWM signal goes high when the SRFF 507 is set which occurs when COMP_OUT and TSWCLK are both high by operation of the AND gate 503. The PWM signal goes low when the SRFF 507 is reset which occurs when COMP_OUT and TSWCLK are both low by operation of the AND gate 505. During the steady state operation, the PWM pulses operate in a normal manner and generally follow the COMP_OUT signal. During the high frequency load transient operation, however, since COMP_OUT and TSWCLK are not high at the same time, no normal PWM pulses occur. Nonetheless, "alternative" pulses occur on COMP_OUT since COMP rises above TWAVE while TSWCLK is low. The APWM signal shown in FIG. 7 is not actually generated by the circuit but represents only the alternative pulses occurring on COMP_OUT without the normal pulses on the PWM signal.

The DFF 511 clocks the logic state of the output of the OR gate 509 as the MEM signal upon falling edges of the TSWCLK signal. During the steady state operation, the PWM signal is high each time TSWCLK goes low so that the output of the OR gate 511 is high, so that MEM remains high or at logic "1". This causes the switch 513 to select the PWM signal as the SPWM signal so that the SPMW reflects the normal PWM pulses. At a time t2, however, the PWM and COMP_OUT signals are both low at the falling edge of TSWCLK so that MEM goes low to logic "0". The switch 511 correspondingly selects the COMP_OUT signal as the SPWM signal when MEM is low. In this manner, the alternative PWM pulses on the COMP_OUT signal are provided to the SPMW signal while the normal PWM pulses are absent. It is noted that a first alternative pulse 701 occurring during the high frequency load transient operation is not provided onto the SPWM signal since MEM is still high at that time. However, the subsequent alternative pulses are provided to the SPWM signal when MEM is low.

FIG. 7 shows a transition from steady state to transient load operation and waveforms associated with the mechanism to restore missing PWM pulses. During the steady state operation, the modulator 506 works in a similar manner as the modulator 106 so that the DC-DC converter 500 operates in a similar manner as the DC-DC converter 100. PWM pulses are initiated when the down-slope of TWAVE crosses COMP, and terminated when its up-slope crosses COMP again. The state of the PWM pulse is clocked into memory (represented as the DFF 511) by TSWCLK at the negative peak of TSWCLK, in which the memory content is indicated by the MEM signal. Any normal PWM pulse is high at the negative triangle peak, so MEM is a good indicator of whether a normal PWM pulse occurred.

During the high frequency load transient operation, COMP no longer intersects the down-slope of TWAVE, so no normal PWM pulses are initiated. After the first complete TSW period with no normal PWM pulse, TSWCLK clocks that information into memory (DFF 511) and MEM goes low. MEM low allows an alternate PWM mechanism to feed PWM pulses to the output. In one embodiment the alternate mechanism allows PWM pulses to initiate on the up-slope of TWAVE. The resulting PWM pulse train may have a small gap where pulses are switched from the normal to the alternate source. This is generally less than twice the TSW period. It is noted that normal operation resumes when COMP no longer misses the down slope of TWAVE. In one embodiment, the logic is arranged to immediately switch back when MEM goes high. In another embodiment, provisions are made so that a normal PWM pulse does not follow too quickly after an alternate PWM pulse.

Although a dual slope modulator is illustrated, the present invention is equally applicable to other modulator types such as leading edge, trailing edge, or dual ramp. For certain other modulator types, the placement of TSWCLK to save whether a normal PWM had occurred may be in a different place, and the alternate PWM mechanism changes depending upon the particular implementation. The principles of the present invention are the same of the other modulation types.

In general, a system and method according to one embodiment determines whether the primary modulator of a system had generated a PWM pulse within a switching cycle, and stores that information. As an example, generating a clock at the point in time where a PWM pulse, if it occurred at all, would be high, and clocking that information into a memory device. In one embodiment, the system generates an alternate PWM pulse based on some other mechanism than the primary modulator of the system. As an example, the primary modulator in a dual slope system restricts pulse initiation to the triangle wave down slope and termination to the up slope. The alternate mechanism removes the restrictions of the primary modulator, such as the restrictions of the anti-double-pulse circuitry. In one embodiment, the system allows the alternate PWM pulse to be used by the system if the primary PWM pulse is missing or otherwise suppressed. In one embodiment, the system switches back to using the primary PWM pulse without excessive pulses occurring.

A modulator for providing control pulses on a pulse control signal which controls operation of a DC-DC converter according to one embodiment includes a comparator, pulse control logic, a memory circuit and a switch circuit. The comparator compares a periodic timing waveform with a compensation signal and provides a comparison signal with preliminary pulses. The pulse logic circuit has an input receiving the comparison signal and an output providing normal pulses on a normal pulse signal. The pulse logic circuit selects only those of the preliminary pulses which are provided during a permissible time window of each period of the periodic timing waveform as normal pulses provided on the normal pulse signal. The memory circuit provides a no pulse indication whenever a normal pulse does not occur on the pulse signal during any period of the periodic timing waveform. The switch circuit selects between the normal pulse signal and the comparison signal based on the no pulse indication for providing the control pulses on the pulse control signal.

A method of generating control pulses to control operation of a pulse width modulation converter according to one embodiment includes providing a periodic timing waveform, providing an error signal indicative of error of an output condition of the converter, comparing the error signal with the periodic timing waveform and generating preliminary pulses on a comparison signal, selecting those of the preliminary pulses that occur during a permissible time window of each period of the periodic timing waveform and providing as normal pulses on a normal pulse signal, providing a pulse indication for any switching cycle of the periodic timing waveform in which a normal pulse is not provided, and selecting between the comparison signal and the normal pulse signal based on the pulse indication.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A modulator for providing control pulses on a pulse control signal which controls operation of a DC-DC converter, comprising:
   a comparator which compares a periodic timing waveform with a compensation signal and which provides a comparison signal with preliminary pulses;
   a pulse logic circuit having an input receiving said comparison signal and an output providing normal pulses on a normal pulse signal, wherein said pulse logic circuit selects only those of said preliminary pulses which are provided during a permissible time window of each period of said periodic timing waveform as said normal pulses provided on said normal pulse signal;
   a memory circuit which provides a no pulse indication whenever a normal pulse does not occur on said normal pulse signal during any period of said periodic timing waveform; and
   a switch circuit which selects between said normal pulse signal and said comparison signal based on said no pulse indication for providing the control pulses on the pulse control signal.

2. The modulator of claim 1, wherein said pulse logic circuit selects only those of said preliminary pulses which are initiated during a first portion of each period of said periodic timing waveform and which are terminated during a second portion of each period of said periodic timing waveform.

3. The modulator of claim 1, wherein said periodic timing waveform is a triangle wave, and wherein said pulse logic circuit selects only those of said preliminary pulses which are initiated when said triangle wave has a slope in a first direction and which are terminated when said triangle wave has a slope in a second and opposite direction.

4. The modulator of claim 1, wherein said pulse logic circuit comprises:
   a first AND gate having a first input receiving said comparison signal, a second input receiving a periodic clock signal having the same period as said periodic timing waveform, and an output providing a set signal;
   a second AND gate having a first input receiving an inverted version of said comparison signal, a second input receiving an inverted version of said periodic clock signal, and an output providing a reset signal; and
   a latch device having a set input receiving said set signal, a reset input receiving said reset signal, and an output providing said normal pulse signal.

5. The modulator of claim 1, wherein said memory circuit comprises:
   an OR gate having a first input receiving said comparison signal, a second input receiving said normal pulse signal, and an output providing a data signal; and
   a latch device having a data input receiving said data signal, a clock input receiving periodic clock signal having the same period as said periodic timing waveform, and an output providing said no pulse indication.

6. The modulator of claim 1, wherein said preliminary pulses comprise potential pulses for the pulse control signal.

7. A DC-DC converter, comprising:
   at least one inductor, each coupled between a corresponding one of at least one phase node and a common output node developing an output voltage;
   at least one power switching circuit, each for switching a corresponding one of said at least one phase node between an input voltage and a reference voltage as controlled by a corresponding one of at least one control pulse signal;
   at least one capacitor coupled between said output node and said reference voltage;
   an error amplifier having an output providing a compensation signal indicative of relative error of said output voltage; and at least one modulator, each comprising:
- a comparator which compares a periodic timing waveform with said compensation signal and which provides a comparison signal with preliminary pulses;
- a pulse logic circuit having an input receiving said comparison signal and an output providing normal pulses on a normal pulse signal, wherein said pulse logic circuit selects only those of said preliminary pulses which are provided during a permissible time window of each period of said periodic timing waveform as said normal pulses provided on said normal pulse signal;
- a pulse detect circuit which provides a pulse indication whenever a normal pulse does not occur on said pulse signal during any period of said periodic timing waveform; and
- a switch circuit which selects between said normal pulse signal and said comparison signal based on said no pulse indication for providing control pulses on a corresponding one of said at least one control pulse signal.

8. The DC-DC converter of claim 7, wherein said at least one inductor comprises a plurality of inductors, wherein said at least one power switching circuit comprises a plurality of power switching circuits, and wherein said at least one modulator comprises a plurality of modulators, further comprising:
- a plurality of current sensors, each sensing current through a corresponding one of said plurality of inductors; and
- a current balance circuit coupled to said plurality of current sensors and said plurality of modulators, wherein said current balance circuit controls said plurality of modulators in an attempt to equalize current through each of said plurality of inductors.

9. The DC-DC converter of claim 7, wherein said at least one inductor comprises a plurality of inductors, wherein said at least one power switching circuit comprises a plurality of power switching circuits, wherein said at least one modulator comprises a plurality of modulators, and wherein said at least one control pulse signal comprises a plurality of control pulse signals, further comprising a timing circuit coupled to said plurality of modulators which attempts to equally space pulses on said plurality of control pulse signals within a predetermined switching period.

10. The DC-DC converter of claim 7, wherein said pulse logic circuit selects only those of said preliminary pulses which are initiated during a first portion of each period of said periodic timing waveform and which are terminated during a second portion of each period of said periodic timing waveform.

11. The DC-DC converter of claim 7, wherein said periodic timing waveform is a triangle wave, and wherein said pulse logic circuit selects only those of said preliminary pulses which are initiated when said triangle wave is decreasing and which are terminated when said triangle wave is increasing.

12. The DC-DC converter of claim 7, wherein said pulse logic circuit comprises:
- a first AND gate having a first input receiving said comparison signal, a second input receiving a periodic clock signal having the same period as said periodic timing waveform, and an output providing a set signal;
- a second AND gate having a first input receiving an inverted version of said comparison signal, a second input receiving an inverted version of said periodic clock signal, and an output providing a reset signal; and
- a latch device having a set input receiving said set signal, a reset input receiving said reset signal, and an output providing said normal pulse signal.

13. The DC-DC converter of claim 7, wherein said memory circuit comprises:
- an OR gate having a first input receiving said comparison signal, a second input receiving said normal pulse signal, and an output providing a data signal; and
- a latch device having a data input receiving said data signal, a clock input receiving periodic clock signal having the same period as said periodic timing waveform, and an output providing said no pulse indication.

14. The DC-DC converter of claim 7, wherein said preliminary pulses comprise potential pulses on said corresponding one of said at least one control pulse signal.

15. A method of providing control pulses to control operation of a pulse width modulation converter, comprising:
- providing a periodic timing waveform;
- providing an error signal indicative of error of an output condition of the converter;
- comparing the error signal with the periodic timing waveform and generating preliminary pulses on a comparison signal;
- selecting those of the preliminary pulses that occur during a permissible time window of each period of the periodic timing waveform and providing as normal pulses on a normal pulse signal;
- providing a pulse indication for any switching cycle of the periodic timing waveform in which a normal pulse is not provided; and
- selecting between the comparison signal and the normal pulse signal based on the pulse indication to provide the control pulses to control operation of the pulse width modulation converter.

16. The method of claim 15, wherein said providing a periodic timing waveform comprises providing a triangle wave and wherein said selecting those of the preliminary pulses that occur during a permissible time window of each period of the periodic timing waveform comprises selecting only those preliminary pulses which are initiated when the triangle wave is changing in a first direction and which are terminated when the triangle wave is changing in a second and opposite direction.

17. The method of claim 15, wherein said selecting those of the preliminary pulses that occur during a permissible time window of each period of the periodic timing waveform comprises selecting only those preliminary pulses which are initiated during a first portion of each period of the periodic timing waveform and which are terminated during a second portion of each period of the periodic timing waveform.

18. The method of claim 15, wherein:
- said providing an error signal indicative of error of an output condition of the converter comprises amplifying a difference between a signal indicative of the output voltage and a reference signal; and
- wherein said comparing the error signal with the periodic timing waveform and generating preliminary pulses on a comparison signal comprises comparing the error signal with a triangle wave and initiating a preliminary pulse whenever the triangle wave falls below the error signal and terminating the preliminary pulse whenever the triangle wave rises above the error signal.

19. The method of claim 18, wherein said selecting those of the preliminary pulses that occur during a permissible time window of each period of the periodic timing waveform comprises selecting those of the preliminary pulses that are initiated when the triangle wave is decreasing and terminated when the triangle wave is increasing.

20. The method of claim 15, wherein the preliminary pulses comprise potential control pulses as the control pulses for controlling operation of the pulse width modulation converter.

* * * * *